United States Patent Office 3,766,295
Patented Oct. 16, 1973

3,766,295
BLOCK POLYMER COMPOSITIONS
Ronald K. Crossland, Manhattan Beach, and Geoffrey Holden, Los Alamitos, Calif., assignors to Shell Oil Company
No Drawing. Filed Mar. 23, 1972, Ser. No. 237,540
Int. Cl. C07d 9/16
U.S. Cl. 260—829       10 Claims

ABSTRACT OF THE DISCLOSURE

Hydrogenated block copolymers comprising in part hydrogenated polymer blocks of butadiene or isoprene are extended with low molecular weight hydrogenated polybutadiene or hydrogenated polyisoprene oligomers respectively; these oligomers have similar microstructures to the microstructure of the corresponding hydrogenated diene polymer block of the block copolymer. The physical properties of these blends are superior to similar blends prepared by the use of mineral extending oils or other low molecular weight polymers.

---

Block copolymers having polymer blocks of monoalkenyl arenes and conjugated dienes have been developed during the past few years. Recently, these have been improved by hydrogenation which may be either complete (see U.S. Pat. 3,333,024) or selective (see U.S. Pat. 3,595,942). These hydrogenated block copolymers have been found useful for many purposes such as in adhesives (see U.S. Pat. 3,239,479) or in such articles as footwear assemblies (see U.S. Pat. 3,539,056). As with most polymers, it is economically desirable and often technically necessary to modify the polymers with extending oils and other formulating components such as resins, pigments, antioxidants and other polymers. It has been the common experience, however, that the addition of most extending oils, while improving the processability of the polymers and reducing the cost of the composition, often results in poor physical properties of one sort or another. Recent efforts have been made to improve this by proper selection of extending oils.

It has been ascertained recently that one of the problems involved in the proper selection of oils, resins and other components to be combined with block copolymers lies in the differing solubility parameters which each of the types of blocks present in the copolymer possesses. It has been found, in fact, that four situations may exist:

(1) An oil (or resin) may be compatible with both types of polymer blocks in the copolymer.
(2) An oil (or resin) may be incompatible with both types of polymer blocks.
(3) An oil (or resin) may be compatible with only the arene or hydrogenated arene polymer blocks.
(4) The oil (or resin) may be compatible only with the hydrogenated polymer blocks of the conjugated dienes.

It has been further noted that the physical properties of the resulting extended block copolymer compositions depend to a large extent into which of the above categories an extending oil (or resin) falls. Consequently, selection or discovery of the proper oils relative to the above categories is of paramount importance for obtaining the maximum combination of desirable physical properties in the resulting extended polymer composition. This selection is, of course, complicated by other technical requirements which, when taken together, may actually be conflicting with one another. Thus, it becomes necessary to arrive at a compromise in many cases, the compromise being a combination of good physical properties so obtained which may, in turn, be at the expense of a single maximum physical property. These considerations are especially important in such commercial products as coatings, films, adhesives and sealants.

One of the economic problems in the manufacture of the components going into compositions discussed above is the usual necessity for separate manufacture of the polymer on the one hand and the extending oil on the other. Another technical problem which has been encountered is the extremely high viscosity of block copolymers dispersed in commercially feasible concentrations in solvents. Another technical problem often encountered with polymer extending oils is in bleed-out which may occur at high or low temperatures, especially at high extending oil ratios. This may, in turn, result in lack or loss of adhesion to a surface on which the coating has been placed as well as a stain on any surface with which such a composition may come in contact.

It is an object of the present invention to provide improved hydrogenated block copolymer compositions. It is a specific object of the invention to improve extended hydrogenated block copolymer compositions. It is a further object of the invention to provide such compositions having an optimum combination of desirable physical properties. It is a further object of the invention to provide an economic process for the coordinated synthesis of a block copolymer and extending oil. Other objects will become apparent during the following detailed description of the invention.

Now, in accordance with the present invention an improved composition is provided comprising:

(a) 100 parts by weight of a block copolymer having at least two polymer blocks A of the group consisting of poly(monoalkenyl arenes) and hydrogenated derivatives thereof, each block A having an average molecular weight between about 4,000 and 50,000; and at least one polymer block B of a hydrogenated poly(conjugated diene) of the group consisting of hydrogenated polybutadiene having, prior to hydrogenation, a 1,2-content of X% wherein X is a number between about 10 and 60, and hydrogenated polyisoprene having, prior to hydrogenation, a combined 1,2- and 3,4-content of Y% where Y is a number between about 5 and about 50, the average molecular weight of block B being between about 20,000 and 250,000; and (b) 5–200 parts by weight of a hydrogenated homopolymer (oligomer) of a conjugated diene of the group consisting of butadiene homopolymers having, prior to hydrogenation, a 1,2-content no more than 10 percentage points different from X, and having an average molecular weight between about 400 and 20,000; and isoprene homopolymers having, prior to hydrogenation, a combined 1,2- and 3,4-content not more than 10 percentage points different from Y, and having an average molecular weight between about 400 and about 20,000; the hydrogenated polybutadiene being blended with the block copolymer having hydrogenated polybutadiene block B, and the hydrogenated polyisoprene being blended with the block copolymer having a hydrogenated polyisoprene block B.

The diene block microstructure required in accordance with the present invention is expressed as the percent of 1,2- and/or 3,4-diene (non-1,4-) units present in the diene polymer block prior to hydrogenation. Butadiene, for example, is polymerized to form 10–60% (X%) of its units in the 1,2-configuration, i.e., 5–30% of the total butadiene carbon atoms are present as pendant ethenyl groups. Isoprene, on the other hand, is polymerized to form 5–50% (Y%) of its units in the 1,2- or 3,4-configuration, i.e., 3–30% of total isoprene carbon atoms as pendant ethenyl or isopropenyl groups. Since, in most cases, the 1,2-configuration is present in insignificant proportions in the isoprene polymer blocks, usually such blocks, according to the present invention will be comprised of 3–30% of the total isoprene carbon atoms as isopropenyl groups. Correspondingly, if the non-1,4-isoprene units in the diene polymer block were all 1,2-configuration 2–20% of the total isoprene carbon atoms would be present as pendant ethenyl groups. Upon hydrogenation (which follows polymerization) the pendant groups are converted to ethyl and isopropyl groups. The oligomer microstructures are based on the same considerations, within the limits $X\pm10$ and $Y\pm10$ as referred to hereinbefore.

Such compositions are especially useful as superior coatings and may be modified with certain resins as discussed hereinafter especially for the production of superior adhesives and sealants.

In accordance with this invention, it has been found that by coordinating the microstructure of the extending oil with that of the hydrogenated diene block of the block copolymer, compositions are obtained having an unpredictable and surprisingly promising set of superior physical properties.

Still, in accordance with this invention a process for the coordinated production of the composition of this invention comprises the following steps:

(a) Block polymerizing a monalkenyl arene and $C_{4-5}$ conjugated diene in an inert solvent and inert atmosphere utilizing a lithium-based initiator whereby a solution of "living" non-hydrogenated precursor of the above described hydrogenated block copolymer is formed, said solution being essentially free of polymerizable monomers;

(b) De-activating the "living" block copolymer if any lithium ions are associated with the polymer;

(c) Injecting $C_{4-5}$ conjugated diene and a lithium-based initiator into the reaction mixture so formed and homopolymerizing the diene whereby a homopolymer precursor of the hydrogenated oligomer described above is formed; and (d) Hydrogenating simultaneously both the block copolymer and the homopolymer so as to obtain the composition described above.

If step (a) in the process just described results in the formation of a living polymer as the end product of the reaction, a proton donor should be injected to remove the associated lithium ion from the polymer prior to step (c) in the process above, namely, prior to injection of the conjugated diene and lithium-based initiator required for the formation of the homopolymer.

It will be seen that this process in effect makes double use of the polymerization equipment which otherwise would be employed solely for the synthesis of either the block copolymer or the oligomer. Moreover, the process outlined above, is highly efficient in that a single hydrogenation stage is required for the hydrogenation of both the block copolymer and the homopolymer. Furthermore, the presence of the latter in the reaction mixture being hydrogenated does not materially alter the viscosity of the block polymer solution but gives more efficient utilization of the manufacturing facility.

Of course, if desired, the block copolymer and the oligomer may be separately prepared and separately hydrogenated after which they may be blended. On the other hand, it is possible to separately prepare the nonhydrogenated polymers, thereafter blend them (preferably in the presence of a compatible mutual solvent) and then hydrogenate the mixture.

The block copolymers contemplated for use in these compositions have two essential types of polymer blocks which will be described prior to their hydrogenation. The terminal blocks, of which at least two are present in the precursor (non-hydrogenated) block copolymer, are monoalkenyl arene blocks such as obtained from styrene, alpha methyl styrene or mixtures of the same. The second type of block is a polymer of either butadiene or isoprene. The microstructure of the polydiene block depends upon the conditions of polymerization and is controllable by the presence or absence of such added materials as ethers (diethyl ether or tetrahydrofuran) or other microstructure regulators. The proportion of these regulators will determine or largely control the microstructure. For example, in the case of block copolymers having polybutadiene as the diene block, the presence of a limited amount of an ether may be employed to produce block copolymers having a predetermined proportion of 1,2-configuration. The amount of diethyl ether in the reaction mixture will preferably be in the order of between about 1% and about 8% of the total reaction mixture, whereas only 0.5–1% of tetrahydrofuran may be required. It is preferred to omit microstructure regulators when isoprene blocks or oligomers are being formed.

The block polymerization of these monomers is known, e.g., U.S. 3,265,765. Lithium-based initiators are employed for this purpose. These may be either monofunctional such as lithium alkyls, e.g., lithium butyl or may be polyfunctional, e.g., dilithio stilbene. The use of monofunctional initiators is preferred. The sequence of addition of the individual monomers will depend upon whether a monofunctional initiator such as lithium alkyls is employed or whether, for example, a difunctional initiator is utilized. Furthermore, the process may include a completely sequential order of monomer addition or may utilize a combination of sequential monomer addition and coupling. While this alternative does not form an essential part of the present invention, the completely sequential process is preferred. This minimizes the chance of any coupling residues or impurities being present during the subsequent hydrogenation step. It has been found that certain of these residues or impurities may damage the maximum efficiency of the hydrogenation catalyst. In a typical process, for example, an inert solvent such as cyclohexane or mixtures thereof with aliphatic solvents such as pentanes or butanes may be employed into which the first monomer (such as styrene, alpha methyl styrene, vinyl toluene or tert-butylstyrene) is injected together with a calculated amount of the initiator such as a butyl lithium.

Polymerization is conducted under conditions known in the art until essentially all of the monomer is consumed. At this point, butadiene or isoprene is injected into the system. Also, a microstructure regulator is introduced either at this time or prior thereto. The diene block polymerizes with the living polymer previously formed to form an intermediate living polymer having the structure A—BLi. After all of the butadiene has been polymerized a second portion of styrene is injected and polymerization proceeds to form the living polymer

A—B—A·Li

In this case, the ultimate unit of the polystyrene-polybutadiene-polystyrene block polymer is associated with the lithium ion as a living polymer. Further polymerization may be terminated by injection of a proton donor, preferably an alcohol such as isopropyl alcohol. Preferably, this is injected in an amount essentially equivalent to the polymeric carbanions so that any excess donor is either absent or present in insignificant amounts.

Other typical polymers which may be prepared by this or other processes include for example, polystyrene-polyisoprene-polystyrene; poly(alpha methyl styrene)-polybutadiene-poly(alpha methyl styrene) and poly(alpha methyl styrene)-polyisoprene-poly(alpha methyl styrene).

The use of coupling agents increases the alternatives available to the manufacturer relative to the configuration of the resulting block copolymers. Sequential addition of monomers results in linear polymer chains. The use of coupling agents provides an opportunity for making either linear polymers or branched (star) polymers. Suitable coupling agents include dihaloalkenes or dihaloalkanes such as dibromo methane. If, for example, a living polymer having the structure A–BLi is treated with a difunctional coupling agent the resulting coupled product then has the structure A—B—B—A. It will be noted that any coupling agent residue which may remain in the polymer chain is to be ignored insofar as the present invention, specification and claims are concerned. If polyfunctional coupling agents such as silicon tetrachloride are employed, then branched block polymers may be obtained. In any process involving coupling such as those described above, it will be noted that the coupled products are no longer "living" polymers since the associated lithium ion has been removed by the coupling step. Consequently, it is only in the processes which involve sequential addition of monomers and no coupling steps that the polymerization is customarily followed by termination of the living polymer with the proton donor.

The number average molecular weights referred to in the specification and claims are those preferably obtained as follows: The molecular weight of the first block polymerized was measured by gel permeation chromatography (GPC) of a terminated sample removed immediately after its polymerization. The chromatograph was calibrated using commercially available polystyrene molecular weight standards, prepared and tested by Mellon Institute procedures. The molecular weights of the second and third blocks polymerized were determined by measuring the polystyrene content of terminated samples removed immediately after polymerization of the second and third blocks, respectively. The molecular weights of the second and third blocks are based on the assumption that all of the polymerized monomer uniformly added to the active polymer chain ends. The present invention especially contemplates the use of block copolymers in which the blocks A have average molecular weights between 4,000 and 50,000, preferably between 5,000 and 35,000 while the blocks B have average molecular weights between about 20,000 and 250,000, preferably between about 22,500 and 150,000. The molecular weights of the individual blocks may be readily controlled and varied to satisfy the contemplated end use of the compositions. Thus, if the proportion of polymer blocks B is between 50 and 80% by weight then the product subsequent to partial or complete hydrogenation as described hereinafter will be elastomeric. However, as the proportion of the hydrogenated diene blocks is reduced below 50 wt. percent, the resulting products tend to assume the characteristics of a thermoplastic resin rather than a rubber. The range of non-chain substituents, e.g., 1,2-content of the butadiene blocks is restricted particularly when elastomeric products are desired after the hydrogenation step. Preferably, the 1,2-content of the butadiene blocks of the block copolymer before hydrogenation is between about 30 and about 60% so as to provide hydrogenated polymers having the most desirable elastomeric characteristics. Similarly, when the block copolymer precursor contains a polyisoprene block, the combined 1,2- and 3,4-content should be between about 0% and about 20% for the most desirable elastomeric properties of the hydrogenated product.

The homopolymers (oligomers) particularly contemplated for use as extending oils in accordance with the present invention, are especially designed to have maximum compatability with the hydrogenated diene blocks of the block copolymer. To achieve this, and as an essential part of the present invention, the microstructure of these precursor homopolymers should match that of the precursor polydiene blocks of the block copolymers as described hereinbefore. Moreover, the average molecular weight (also determined as referred to above) is restricted so as to provide extending oils which act as processing aids and plasticizers as contrasted to higher molecular weight materials which are less efficient processing aids or low molecular weight materials which are too volatile. If the homopolymers are not closely coordinated in their microstructure with the corresponding diene blocks of the polymer blocks, then the combination of physical properties of the resulting compositions will not be as highly desirable as those discussed hereinafter.

While the microstructure of the oligomer prior to hydrogenation may differ no more than 10 percentage points from X or Y (as defined for the microstructure of the block copolymer non-hydrogenated precursor, superior results are obtained if this difference is restricted to 2.5 percentage points). It will be understood that by "hydrogenated homopolymer" or "hydrogenated polymer block" is meant the described homopolymer blocks which have been hydrogenated at least to the extent of reducing more than 90% of the aliphatic double bonds and that, of course, this is done subsequent to polymerization. Preferably, at least about 98% of the double bonds are so reduced.

The hydrogenation of the block copolymer and of the homopolymers may be conducted by methods known in the art. Preferred catalyst systems are disclosed in U.S. 3,595,942. Hydrogenation is conducted so as to reduce at least 90% and preferably at least 98% of the aliphatic double bonds in the diene blocks of the block copolymer as well as in the homopolymers. The option may be exercised to hydrogenate the block copolymers so that, in addition to hydrogenating at least 98% of the aliphatic double bonds, no more than about 25% of the aromatic double bonds are also reduced by hydrogenation. On the other hand, hydrogenation conditions may be selected to reduce more than 90% of all of the double bonds in the block copolymer if this is desired. This may be effected, for example, by increasing hydrogen pressure or hydrogenation temperature or both, utilizing the same types of hydrogenation catalyst as those described in U.S. 3,595,942.

In the process of the invention for the in situ preparation of the compositions of this invention, it will be realized that if a microstructure regulator is already present in the reaction mixture at the time the block copolymer synthesis is completed it will act in a similar way to control the microstructure of the diene homopolymer being made in the same reaction vessel. It may be necessary to modify the amount of structure regulator, but this is easily accomplished.

The compositions of this invention may be modified with other components such as resins. In accordance with the four alternative types of modifying components referred to early in this specification, the resins may be selected depending upon the physical properties desired in the eventual compositions. Single resins may be employed or combinations of resins either of the same or different types may be utilized. It has been determined that resins which are largely compatible with the hydrogenated diene polymer blocks act as tackifying resins while resins which are largely compatible with the alkenyl arene or hydrogenated alkenyl arene polymer blocks when they have softening points above 100° C. substantially improve the adhesive properties of the compositions at elevated temperatures. Suitable resins of each of these types are the following:

Tackifying resins:
  (a) Copolymer of 40–80 wt. percent 1,3-pentadiene and 60–20 wt. percent 2-methyl-2-butene
  (b) Pentaerythritol ester of hydrogenated rosin
  (c) Alpha pinene resins
  (d) Beta pinene resins
  (e) Olefinic resins
  (f) Synthetic polyterpenes High softening point resins:
  (a) Coumarone-indene resins, e.g. 104–155° C. softening point
  (b) Vinyl toluene-alpha methyl styrene copolymers, e.g. 120° softening point
  (c) Alpha methyl styrene homopolymers, e.g. 147° C. softening point
  (d) Polyindene resins, e.g. 101° C. softening point Of the above type of resins, the copolymer of 1,3-pentadiene and 2-methyl-2-butene is the most preferred tackifying resin while the high softening point coumarone-indene resins are the most desirable resins for imparting high temperature adhesive properties.

The following comparative examples illustrate the combination of superior physical properties obtained by the use of the coordinated homopolymeric diene extenders as compared with other alpha olefin oligomers or hydrocarbon oils derived primarily from petroleum resources.

In the following table the tensile and elongation properties were determined on cast films containing a hydrogenated block copolymer and an equal amount of the listed extender oils. The hydrogenated block copolymer had the structure polystyrene-hydrogenated polybutadiene-polystyrene wherein the polybutadiene block had 40% 1,2-content, the block molecular weights of the block copolymer being 10,000–50,000–10,000.

Polymerization of block copolymer

Styrene (15.7 g.) and cyclohexane (89.1 g.) were placed in a reactor. Impurities were scavenged to incipient polymerization with butyl lithium. The styrene was then polymerized at temperatures between 29° C. and 54° C. using $1.59 \times 10^{-3}$ gm. moles secondary butyl lithium. The entire solution was then anaerobically transferred to a surge vessel.

The following were added to the empty reactor:

| | G. |
|---|---|
| Cyclohexane | 315 |
| Diethyl ether | 30.7 |
| Butadiene | 71.4 |

This charge was scavenged to incipient polymerization using butyl lithium after which the active polystyryl lithium solution (95.3 g. total) was transferred rapidly to the scavenged feed to initiate block polymerization with the butadiene. The polymerization of the latter was carried out at temperatures between 25° C. and 72° C. Styrene (14.3 g.) was then added and polymerization continued at about 65° C. after which isopropyl alcohol ($3.55 \times 10^{-3}$ gm. moles) was added to inactivate the lithium ions. The resulting block copolymer had the structure polystyrene-polybutadiene-polystyrene wherein the polybutadiene block had a 1,2-content of 40.3%. The block molecular weights were 10,000–50,000–10,000.

Hydrogenation of the block copolymer

The hydrogenator was charged with the following components:

| | G. |
|---|---|
| Block copolymer | 100 |
| Cyclohexane | 702 |
| Diethyl ether | 31 |

To the hydrogenator were then added aluminum triethyl (3.5 mm.) and isopropyl alcohol (17.0 mm.). The previously prepared catalyst which was then added to the hydrogenator comprise the reaction product of nickel octoate (0.63 mm.) and aluminum triethyl (1.89 mm.) in cyclohexane. The polymer cement and catalyst were mixed for about five minutes under about 20 p.s.i.g. hydrogen, then heated and pressured to reaction conditions (90° C., 700 p.s.i.g.). The cement was maintained at these conditions for ten hours. After two hours none of the diene double bonds could be detected by infrared inspection.

In the table, the hydrogenated polybutadiene (the extender of the present invention) had the same 1,2-content prior to hydrogenation and had an average molecular weight of 9,100.

Preparation of butadiene oligomer

The following components were injected into a reactor.

| | G. |
|---|---|
| Butadiene | 100 |
| Cyclohexane | 526 |
| Diethyl ether | 40 |

The charge was scavenged to remove impurities by reaction with butyl lithium until incipient polymerization was noted. Polymerization was then conducted using secondary butyl lithium ($10.5 \times 10^{-3}$ gm. moles), the polymerization being conducted between 28° C. and 50° C. The polymerization was terminated by the addition of isopropyl alcohol ($11.2 \times 10^{-3}$ gm. moles). The product was polybutadiene having a number average molecular weight of 9,100 and having a 1,2-content of 40.3%.

Hydrogenation of the butadiene oligomer

The oligomer was hydrogenated using essentially the same catalyst and hydrogenation conditions as described above for the block copolymer.

The shear adhesion time and Polyken probe tack were determined on pressure sensitive adhesive formulations containing 100 parts of the same hydrogenated block copolymer, 100 parts of a tackifying resin and 25 parts of extender (the term "parts" refers to parts by weight). The tackifying resin employed was a copolymer of about equal amounts of 1,3-pentadiene and 2-methyl-2-butene the resin having a softening point of 95° C. The shear adhesions at 100° C. were determined by method No. 7 of the Pressure Sensitive Tape Council. The conditions employed were: an adhesive layer thickness of 1–2 mils; overlap area 0.5 sq. inch; shear load 500 g. The composition having the single resin had a shear adhesion time at 100° C. for 16 hours, while the composition having both types of resins had a shear adhesion time at 100° C. of 380 hours.

TABLE

| Extender | Mol wt. | Tensile strength at break, p.s.i.[1] | Elongation at break, percent | Shear adhesion at 100° C., minutes | Polyken probe tack, kg.[2] |
|---|---|---|---|---|---|
| Naphthenic oil | 305 | 550 | 650 | 330 | 1.06 |
| White paraffinic oil | 480 | 1,020 | 810 | 390 | 0.99 |
| Petroleum extending oil | 330 | 560 | 680 | 400 | 0.94 |
| Polybutene oligomer | 2,700 | 1,500 | 1,000 | 26 | 1.27 |
| Do | 400 | 1,050 | 830 | 940 | 1.29 |
| Hydrogenated polybutadiene | 9,100 | 1,400 | 1,050 | 1,470 | 1.38 |

[1] ASTM D4-12-51T.
[2] ASTM proposed tentative method for inverted probe tack measurements.

It will be noted from the above table that the only extender providing superior properties in all four of the tested aspects was the hydrogenated polybutadiene of the present invention. Each of the other extending oils, which may have been satisfactory in one or more of the test properties, fail to provide the superior combination of properties obtained by the use of the described hydrogenated polybutadiene.

We claim as our invention:
1. A composition comprising:
 (a) 100 parts by weight of a block copolymer having at least two polymer blocks A of the group consisting of poly(monoalkenyl arenes) and hydrogenated derivatives thereof, each block A having an average molecular weight between about 4,000 and 50,000; and at least one polymer block B of a hydrogenated poly(conjugated diene) of the group consisting of hydrogenated polybutadiene having, prior to hydrogenation, a 1,2-content of X% wherein X is a number between about 10 and about 55, and hydro- genated polyisoprene having, prior to hydrogenation, a combined 1,2- and 3,4-content of Y% wherein Y is a number between about 5 and about 50, the average molecular weight of block B being between about 20,000 and about 250,000; and (b) 5–200 parts by weight of an essentially completely hydrogenated homopolymer of a conjugated diene of the group consisting of butadiene homopolymers having, prior to hydrogenation, a 1,2-content no more than 10 percentage points different from X and an average molecular weight between about 400 and about 20,000; and isoprene homopolymers having, prior to hydrogenation, a combined 1,2- and 3,4- content no more than 10 percentage points different from Y and an average molecular weight between 400 and about 20,000; the hydrogenated polybutadiene being blended with the block copolymer having a hydrogenated polybutadiene block B, and the hydrogenated polyisoprene being blended with the block copolymer having a hydrogenated polyisoprene block B.

2. A composition according to claim 1 wherein the block copolymer has polystyrene blocks A and hydrogenated polyisoprene blocks B, and the homopolymer is hydrogenated polyisoprene.

3. A composition according to claim 1 wherein the block copolymer has polystyrene blocks A and hydrogenated polybutadiene blocks B, and the homopolymer is hydrogenated polybutadiene.

4. A composition according to claim 1 wherein the block copolymer has poly(alpha methyl styrene) blocks A and hydrogenated polybutadiene blocks B, and the homopolymer is hydrogenated polybutadiene.

5. A composition according to claim 1 wherein the block copolymer has hydrogenated polystyrene blocks A and hydrogenated polybutadiene blocks B, and the homopolymer is hydrogenated polybutadiene.

6. A composition according to claim 1 wherein X is between 15 and 50.

7. A composition according to claim 1 comprising in addition 25–300 parts by weight of a synthetic hydrocarbon resin, said resin comprising 40–80 wt. percent of units derived from 1,3-pentadiene and 60–20 wt. percent units derived from 2-methyl-2-butene.

8. A composition according to claim 1 containing in addition 25–200 parts by weight of a coumarone-indene resin having a softening point above about 100° C.

9. A process for the preparation of a composition according to claim 1 which comprises:

(a) polymerizing a monoalkenyl arene and a $C_{4-5}$ conjugated diene in an inert solvent, utilizing a lithium-based initiator whereby a non-hydrogenated block polymer according to claim 1(a) is formed;

(b) deactivating any lithium ions associated with the polymer;

(c) injecting a $C_{4-5}$ conjugated diene and a lithium-based initiator into the reaction mixture and homopolymerizing the diene whereby a homopolymer according to claim 1(b) is formed; and (d) hydrogenating the mixture of block polymer and homopolymer.

10. A process according to claim 9 wherein a "living" block polymer is formed, as the end product of the reaction, said living block polymer being the block polymer associated with at least one lithium ion; and wherein said ionic association is broken by addition of a proton donor to the reaction mixture prior to step (c).

References Cited
UNITED STATES PATENTS

| | | | |
|---|---|---|---|
| 3,238,173 | 3/1966 | Bailey et al. | 260—29.7 |
| 3,265,765 | 8/1966 | Holden et al. | 260—876 B |
| 3,352,944 | 11/1967 | Wheat | 260—876 B |
| 3,534,965 | 10/1970 | Harrison et al. | 273—218 |
| 3,635,861 | 1/1972 | Russell | 260—27 |
| 3,660,323 | 5/1972 | Raguse | 260—5 |

MURRAY TILLMAN, Primary Examiner

J. SEIBERT, Assistant Examiner

U.S. Cl. X.R.

260—27 BB; 876 B